United States Patent Office 3,193,552
Patented July 6, 1965

3,193,552
3-ARYL-4-HALOPYRIDAZONES-(6)
AND SYNTHESIS THEREOF
Karl Dury and Franz Reicheneder, Ludwigshafen (Rhine), Germany, assignors to Badische Anilin- & Soda-Fabrik Aktiengesellschaft, Ludwigshafen (Rhine), Germany
No Drawing. Filed Mar. 25, 1963, Ser. No. 267,796
Claims priority, application Germany, Mar. 29, 1962,
B 66,579
16 Claims. (Cl. 260—250)

This invention relates to 3-aryl-4-halopyridazones-(6) and to a process for the production of such compounds.

It is an object of this invention to provide a process by means of which new substances—3-aryl-4-halopyridazones-(6)—can be produced which are suitable for the production of reactive dyes.

It is another object of this invention to provide a very simple process for the production of 3-aryl-4-halopyridazones-(6).

These objects are achieved according to this invention by reacting with hydrazine γ-aryl-α,β-dihalo-γ-hydroxycrotonic acid or γ-lactones thereof which in the aryl radical may bear one or two substituents. The new compounds have the general formula:

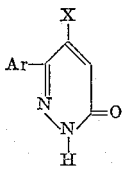

where Ar is a member selected from the group consisting of phenyl, naphthyl, mononitrophenyl, phenyl and naphthyl bearing 1 to 2 alkyl groups with 1 to 4 carbon atoms, phenyl and naphthyl bearing 1 to 2 alkoxy groups with 1 to 4 carbon atoms, phenyl and naphthyl bearing 1 to 2 hydroxy groups, phenyl and naphthyl bearing 1 to 2 acylamino groups where the acyl groups contain 2 to 8 carbon atoms, phenyl and naphthyl bearing 1 to 2 acyloxy groups where the acyl groups contain 2 to 8 carbon atoms, and phenyl and naphthyl bearing 1 to 2 halogen atoms selected from the group consisting of chlorine and bromine.

It is surprising that not only is the pyridazone ring formed, but the α-halogen atom is readily split off from the initial compound at the same time.

The γ-aryl-α,β-dihalo-γ-hydroxycrotonic acid or the γ-lactones thereof, preferably the corresponding chlorine or bromine compounds, may be prepared for example by condensation of β-formyl-α,β-dichloroacrylic acid with an aromatic hydrocarbon in the presence of an acid condensing agent, such as aluminum chloride, sulfuric acid, polyphosphoric acid or boron trifluoride. In addition to benzene, it is possible to use naphthalene and benzene hydrocarbons which have been substituted once or twice. The substituents may be for example alkyl or alkoxy groups having one to four carbon atoms, acyloxy or acylamino groups having two to eight carbon atoms, hydroxy groups or halogen atoms, such as chlorine or bromine atoms.

The hydrazine is advantageously used in the form of its hydrate and in such an amount that two moles of hydrazine is used for each mole of γ-aryl-α,β-dihalo-γ-hydroxycrotonic acid or γ-lactone thereof. Smaller or larger amounts of hydrazine may however be used e.g. 1 mole or up to 5 moles hydrazine for each mole of γ-aryl-α,β-dihalo-γ-hydroxycrotonic acid or γ-lactone thereof. When using smaller amounts of hydrazine it is advantageous to add about an equimolar amount of a base, such as caustic soda or caustic potash solution, barium hydroxide, sodium or potassium carbonate or bicarbonate, sodium acetate, or an amide, such as dimethylformamide, methylpyrrolidone, or trialkylamines, the amide in the latter case being used in excess as a solvent.

The reaction is advantageously carried out in the presence of solvents or diluents, e.g., an alkanol with 1 to 4 carbon atoms or an alkandiol with 2 to 6 carbon atoms, for example methanol, ethanol, propanol, isopropanol, ethylene glycol, methyl glycol, propylene glycol, or N-methyl-pyrrolidone, dimethylformamide, dimethyl sulfoxide or water, and advantageously at elevated temperature, for example between 50° and about 160° C., preferably between 70° and 120° C. The solvent or diluent is used in general in an amount of up to 10 parts per part of γ-aryl-α,β-dihalo-γ-hydroxycrotonic acid or the corresponding γ-lactone. As a rule one of the reactants is placed in a reactor and the other is allowed to drip in slowly. The reaction mixture is then heated while stirring and if necessary allowed to boil under reflux. The whole is then cooled, acidified with or without the addition of water and the deposited crystals are separated. They may easily be purified by recrystallization from an organic solvent such as dioxane.

The new 3-aryl-4-halopyridazones-(6) thus obtained are valuable intermediates for the production of reactive dyes and may be used as fungicides or intermediates for fungicides. The reactive dyes may be prepared for example very simply in the following way:—A nitro group is introduced into the aryl radical by sulfochlorination and substitution of the $SO_2Cl$ group for a nitro group and the nitro group is reduced to an amino group, the amino group is diazotized and then coupled with a dye base. The dyes thus obtained are suitable for dyeing cotton.

The invention is further illustrated by the following examples. The parts are by weight.

*Example 1*

3 parts of γ-phenyl-α,β-dichloro-Δ$^{α,β}$-crotonolactone is dissolved in 30 parts of methyl glycol and 3 parts of 80% hydrazine hydrate added. The mixture is refluxed for about four hours. It is then cooled and diluted with twice the volume of water, acidified with dilute hydrochloric acid, the deposited crystals are filtered off and the mother liquor is shaken with ethyl acetate. The dried ethyl acetate solution is concentrated, the crystalline residue united with the filtered off crystals and the whole recrystallized from dioxane. 2.4 parts of 3-phenyl-4-chloropyridazone-(6) is obtained as white crystals having the melting point 230° to 231° C.

$C_{10}H_7ClN_2O$ calculated: C, 58.1%; T, 3.39%; N, 13.55%; Cl 17.2%. Found: C, 58.1%; H, 3.6%; N, 13.1%; Cl, 16.9%.

*Example 2*

5 parts of γ-phenyl-α,β-dichloro-Δ$^{α,β}$-crotonolactone, dissolved in 40 parts of methanol, is reacted with 3 parts of 100% hydrazine hydrate at waterbath temperature. After half an hour, the product is worked up as described in Example 1 and 4.5 parts of 3-phenyl-4-chloropyridazone-(6) is obtained.

*Example 3*

3 parts of γ-phenyl-α,β-dichloro-Δ$^{α,β}$-crotonolactone is introduced in portions into 3 parts of hydrazine hydrate, diluted with 10 parts of water, at 90° C. The lactone at first passes into solution and later a crystalline reaction product separates out. After cooling, this is filtered off and 3 parts of crude 3-phenyl-4-chloropyridazone-(6) is obtained.

*Example 4*

5 parts of γ-phenyl-α,β-dichloro-Δ$^{α,β}$-crotonolactone is dissolved in 20 parts of N-methylpyrrolidone and then 3 parts of hydrazine hydrate added at 50° C. Twenty minutes later, the whole is cooled, diluted with water and acidified with dilute hydrochloric acid. 4.5 parts of 3-phenyl-4-chloro-pyridazone-(6) is obtained.

By using dimethylformamide, dimethylsulfone or tetramethylenesulfone as solvent instead of N-methylpyrrolidone, 3-phenyl-4-chloropyridazone-(6) is obtained in equally good yields.

*Example 5*

230 parts of finely powdered γ-phenyl-α,β-dichloro-Δ$^{α,β}$-crotonolactone is suspended in 350 parts of water. 150 parts of hydrazine hydrate is dripped in slowly at 60° C., the temperature rising to 90° to 95° C. The whole is then boiled for ten minutes. The pyridazone formed is filtered off with suction, and recrystallized from dioxane. 160 parts of crystalline 3-phenyl-4-chloropyridazone-(6) having the melting point 230° to 231° C. is obtained.

*Example 6*

22.9 parts of γ-phenyl-α,β-dichloro-Δ$^{α,β}$-crotonolactone is dissolved in 30 parts of N-methylpyrrolidone and heated on a steam bath with 5 parts of hydrazine hydrate for fifteen minutes. The product is worked up as described in Example 4, and recrystallized from ethyl glycol. 10.5 parts of 3-phenyl-4-chloropyridazone-(6) is obtained.

*Example 7*

11.4 parts of γ-phenyl-α,β-dichloro-Δ$^{α,β}$-crotonolactone is introduced into a solution of 7 parts of barium hydroxide in 150 parts of water at 40° C. 2.5 parts of hydrazine hydrate is added and the whole boiled up for a short time. The crystals formed are filtered off. 9.5 parts of 3-phenyl-4-chloropyridazone-(6) is obtained.

*Example 8*

10 parts of γ-(p-methoxyphenyl)-α,β-dichloro-Δ$^{α,β}$-crotonolactone is suspended is 50 parts of water and 5 parts of hydrazine hydrate is added. The mixture is heated for fifteen minutes on a steam both and then cooled. 8.5 parts of 3-(p-methoxyphenyl)-4-chloropyridazone-(6) is filtered off and recrystallized from ethyl glycol. The melting point is 227° to 228° C.

$C_{11}H_9O_2N_2Cl$ calculated: C, 55.8%; H, 3.81%; N, 11.85%; Cl, 15.0%. Found: C, 55.9%; H, 4.2%; N, 12.1%; Cl, 15.2%.

*Example 9*

4 parts of γ-(p-chlorophenyl)-α,β-dichloro-Δ$^{α,β}$-crotonolactone is stirred into 20 parts of water and then 3 parts of hydrazine hydrate is added. The whole is heated on a steam bath for one quarter of an hour and then worked up as described in Example 7. 3.5 parts of 3-(p-chlorophenyl)-4-chloropyridazone-(6) is obtained; melting point 211° to 212° C. after recrystallization from ethyl glycol.

$C_{10}H_6ON_2Cl_2$ calculated: C, 48.7%; H, 2.49%; N, 11.6%; Cl, 29.5%. Found: C, 49.8%; H, 2.5%; N, 11.4%; Cl, 29.6%.

*Example 10*

5 parts of γ-phenyl-α,β-dibromo-Δ$^{α,β}$-crotonolactone (melting point 74° to 75° C.) is suspended in 30 parts of water and then 5 parts of hydrazine hydrate is slowly added while stirring. The whole is heated at 80° C. for ten minutes and then cooled. The 3-phenyl-4-bromopyridazone-(6) is filtered off by suction. After recrystallisation from ethyl glycol, white crystals are obtained having the melting point 235° to 236° C.

$C_{10}H_7ON_2Br$ calculated: C, 47.8%; H, 2.79%; N, 11.15%; Br, 31.9%. Found: C, 48.2%; H, 3.0%; N, 10.9%; Br, 31.2%.

*Example 11*

2.5 parts of hydrazine hydrate is added to a solution of 3.5 parts of potassium carbonate in 30 parts of water. This mixture is slowly added to a suspension of 11 parts of γ-phenyl-α,β-dichloro-Δ$^{α,β}$-crotonolactone in 50 parts of water. The whole is heated on a steam bath for five hours. 10 parts of 3-phenyl-4-chloropyridazone-(6) is formed and is purified in the conventional way. The same result is obtained when 5 parts of triethylamine is added instead of the potassium carbonate.

*Example 12*

A solution of 3.5 parts of sodium acetate and 2.5 parts of hydrazine hydrate in 20 parts of water is dripped into a suspension in 50 parts of water of 11 parts of the same lactone as in Example 11. The whole is heated on a steam bath for five hours. 10 parts of crude product is obtained which is purified by recrystallization and is identical with the product of Example 1.

*Example 13*

10 parts of γ-(p-hydroxyphenyl)-α,β-dichloro-Δ$^{α,β}$-crotonolactone is dissolved in 30 parts of monoethyl glycol by gentle heating and slowly reacted with 10 parts of hydrazine hydrate. After the reaction has ceased, the whole is diluted with water. The crystalline 3-(p-hydroxyphenyl)-4-chloropyridazone-(6) obtained is filtered off with suction and recrystallized from ethyl glycol; melting point 296° to 298° C.

$C_{10}H_7O_2N_2Cl$ calculated: C, 53.9%; H, 3.15%; N, 12.6%; Cl, 15.95%. Found: C, 53.7%; H, 3.4%; N, 12.4%; Cl, 15.7%.

*Example 14*

2 parts of γ-(p-acetaminophenyl)-α,β-dichloro-Δ$^{α,β}$-crotonolactone (melting point 157° to 158° C.) is suspended in 30 parts of water and reacted with 5 parts of hydrazine hydrate. Upon heating on a steam bath, the whole at first passes into solution. After about ten minutes, 1.6 parts of crystals has separated out from the solution. After recrystallization from ethyl glycol, the 3-(p-acetaminophenyl)-4-chloropyridazone-(6) has a melting point of 265° C.

$C_{12}H_{10}O_2N_3Cl$ calculated: C, 54.7%; H, 3.79%; N, 15.95%; Cl, 13.45. Found: C, 55.0%; H, 4.3%; N, 15.7%; Cl, 13.0%.

*Example 15*

9 parts of γ-(p-acetoxyphenyl)-α,β-dichlorocrotonolactone suspended in 50 parts of water is slowly introduced into 10 parts of hydrazine hydrate. When the evolution of gas has ceased, the whole is heated at 85° to 90° C. for five minutes. Conventional working up gives 4 parts of 3-(p-acetoxyphenyl)-4-chloropyridazone-(6) in the form of white crystals which after two recrystallisations from monoethyl glycol melt between 221° and 222° C.

*Analysis.*—Calculated: Cl, 13.4%. Found: Cl, 12.8%.

By concentration of the combined mother liquors, a further fraction of crystals is obtained having the melting point 297° to 298° C. It consists of 3-(p-hydroxyphenyl)-4-chloropyridazone-(6) and is identical with the product of Example 13. 3-(p-acetoxyphenyl)-4-chloropyridazone-(6) shows good fungicidal effect when applied against grape mildew.

*Example 16*

10 parts of γ-(o-tolyl)-α,β-dichlorocrotonolactone is reacted with 10 parts of hydrazine hydrate in the way described in Example 1. The product is worked up as described in Example 1 and 6 parts of 3-o-tolyl-4-chloropyridazone-(6) is obtained. A sample recrystallized from methanol melts at between 219° and 220° C.

*Analysis.*—Calculated: Cl, 16.15%. Found: Cl, 16.4%.

*Example 17*

10 parts of γ-[α'-(β'-methoxy)-naphthyl]-α,β-dichlorocrotonolactone is dissolved in 50 parts of glacial acetic acid at 80° C. and 20 parts of hydrazine hydrate is slowly added. The whole is stirred for half an hour at 100° C. and then concentrated to two thirds of its volume and diluted with twice the volume of water. The deposited crystalline mass is recrystallized from a large amount of methanol. 4 parts of halogen-free 3-[α-(β-methoxy)-naphthyl] - 4 - hydrazinopyridazone-(6) having a melting point of 256° C. is first deposited. 3.5 parts of 3-[α-(β-methoxy)-naphthyl]-4-chloropyridazone-(6) is recovered from the mother liquor by concentration; this chloro compound is recrystallized from acetonitrile and then is obtained as white felted needles having the melting point 246° to 247° C.

*Analysis.*—Calculated: Cl, 12.4%. Found: Cl, 12.4%.

Example 18

8 parts γ - (3,4 - dimethoxyphenyl)-α,β-dichlorocrotonolactone is suspended in 30 parts of water. 10 parts of hydrazine hydrate is added to the mixture at water bath temperature and the whole diluted with 10 parts of water. After half an hour the reaction product is filtered off with suction and recrystallized from monoethyl glycol. 6.5 parts 3-(3',4'-dimethoxyphenyl - 4 - chloropyridazone-(6) is obtained in the form of white leaflets melting at 237° to 238° C.

$C_{12}H_{11}O_3N_2Cl$ (molecular weight 266.5) calculated: C, 54.1%; H, 4.13%; O, 18.05%; N, 10.5%; Cl, 13.32%. Found: C, 54.2%; H, 4.1%; O, 17.9%; N, 10.4%; Cl, 13.5%.

Example 19

5 parts of hydrazine hydrate is added at water bath temperature to 5 parts of γ - (m - nitrophenyl)-α,β-dichlorocrotonolactone suspended in 30 parts of water. The deep violet color of the solution which forms immediately changes to a pale brown upon a clearly visible reaction. 2 parts of 3 - (m-nitrophenyl)-4-chloropyridazone - (6) is obtained. After recrystallization from monoethyl glycol the compound melts at 266° to 267° C.

*Analysis.*—Calculated: C, 47.7%; H, 2.39%; O, 19.1%; N, 16.7%; Cl, 14.15%. Found: C, 48.0%; H, 2.2%; O, 19.6%; N, 16.4%; Cl, 13.9%.

We claim:

1. A compound of the formula:

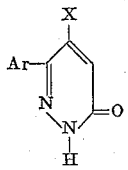

where Ar is a member selected from the group consisting of phenyl, naphthyl, monoalkyl phenyl, dialkyl phenyl, monoalkyl naphthyl, dialkyl naphthyl, wherein said alkyl substituents have 1–4 carbon atoms, monoalkoxy phenyl, dialkoxy phenyl, monoalkoxy naphthyl, dialkoxy naphthyl, wherein said alkoxy substituents have 1–4 carbon atoms, monohydroxy phenyl, dihydroxy phenyl, monohydroxy naphthyl, dihydroxy naphthyl, mononitrophenyl, monoalkanoylaminophenyl, dialkanoylaminophenyl, monoalkanoylaminonaphthyl, dialkanoylaminonaphthyl, monoalkanoyloxyphenyl, dialkanoyloxyphenyl, monoalkanoyloxynaphthyl, and dialkanoyloxynaphthyl, wherein said alkanoyl groups respectively have 2–8 carbons, monohalo phenyl, dihalo phenyl, monohalo naphthyl, and dihalo naphthyl, wherein the halo group is selected from the group consisting of chlorine and bromine; and X is a member selected from the group consisting of chlorine and bromine.

2. 3-phenyl-4-chloro-pyridazone-(6).
3. 3-[p-methoxyphenyl]-4-chloropyridazone-(6).
4. 3-[p-chlorophenyl]-4-chloropyridazone-(6).
5. 3-phenyl-4-bromo-pyridazone-(6).
6. 3-[p-hydroxyphenyl]-4-chloropyridazone-(6).
7. 3-[p-acetylaminophenyl]-4-chloro-pyridazone-(6).
8. 3-[p-acetoxy-phenyl]-4-chloro-pyridazone-(6).
9. 3-o-tolyl-4-chloro-pyridazone-(6).
10. 3-[α - (β - methoxy-)naphthyl] - 4 - chloro-pyridazone-(6).
11. A process for the production of 3-aryl-4-halopyridazone-(6) of the formula:

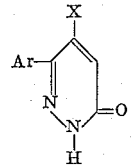

where Ar is a member selected from the group consisting of phenyl, naphthyl, monoalkyl phenyl, dialkyl phenyl, monoalkyl naphthyl, dialkyl naphthyl, wherein said alkyl substituents have 1–4 carbon atoms, monoalkoxy phenyl, dialkoxy phenyl, monoalkoxy naphthyl, dialkoxy naphthyl, wherein said alkoxy substituents have 1–4 carbon atoms, monohydroxy phenyl, dihydroxy phenyl, monohydroxy naphthyl, dihydroxy naphthyl, mononitrophenyl, monoalkanoylaminophenyl, dialkanoylaminophenyl, monoalkanoylaminonaphthyl, dialkanoylaminonaphthyl, monoalkanoyloxyphenyl, dialkanoyloxyphenyl, monoalkanoyloxynaphthyl, and dialkanoyloxynaphthyl, wherein said alkanoyl groups respectively have 2–8 carbons, monohalo phenyl, dihalo phenyl, monohalo naphthyl, and dihalo naphthyl, wherein the halo group is selected from the group consisting of chlorine and bromine; and X is a member selected from the group consisting of chlorine and bromine, which process comprises reacting a compound selected from the group consisting of

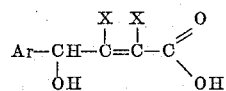

and

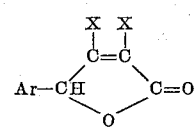

where Ar and X have the meanings given above, with a compound selected from the group consisting of hydrazine and hydrazine hydrate.

12. The process of claim 11 wherein the reaction is carried out in the presence of a solvent selected from the group consisting of an alkanol with 1 to 4 carbon atoms, an alkanediol with 2 to 6 carbon atoms, methyl glycol, N-methylpyrrolidone, dimethylformamide, dimethylsulfoxide and water.

13. The process of claim 11 wherein the reaction is carried out at a temperature between 50° and 160° C.

14. The process of claim 12 wherein the reaction is carried out at a temperature between 50° and 160° C.

15. The process of claim 11 wherein the reaction is carried out at a temperature between 70° and 120° C.

16. The process of claim 12 wherein the reaction is carried out at a temperature between 70° and 120° C.

References Cited by the Examiner

UNITED STATES PATENTS

| | | | |
|---|---|---|---|
| 2,624,730 | 1/53 | Steck | 260—250 |
| 2,628,181 | 2/53 | Mowry | 260—250 |

NICHOLAS S. RIZZO, *Primary Examiner.*

WALTER A. MODANCE, *Examiner.*